United States Patent
Park et al.

(10) Patent No.: US 7,920,234 B2
(45) Date of Patent: Apr. 5, 2011

(54) TRANSFLECTIVE TYPE LIQUID CRYSTAL DISPLAY DEVICE

(75) Inventors: Ku Hyun Park, Gyeonggi-Do (KR);
Jong Hwae Lee, Seoul (KR); Hyun Ho Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 359 days.

(21) Appl. No.: 11/823,810

(22) Filed: Jun. 27, 2007

(65) Prior Publication Data

US 2008/0043160 A1  Feb. 21, 2008

(30) Foreign Application Priority Data

Jun. 30, 2006  (KR) .................. 10-2006-0061537
Apr. 25, 2007  (KR) .................. 10-2007-0040231

(51) Int. Cl.
*G02F 1/1335* (2006.01)
*G02F 1/1343* (2006.01)
*G02F 1/1333* (2006.01)

(52) U.S. Cl. ............ 349/114; 349/38; 349/39; 349/113; 349/138; 349/139

(58) Field of Classification Search .............. 349/38, 349/39, 113, 114, 138, 139
See application file for complete search history.

(56) References Cited

U.S. PATENT DOCUMENTS

| 2003/0038908 A1 * | 2/2003 | Ikeno et al. | 349/113 |
| 2004/0201802 A1 * | 10/2004 | Ha et al. | 349/114 |
| 2007/0013625 A1 * | 1/2007 | Hong | 345/87 |

FOREIGN PATENT DOCUMENTS
CN  1888963 A  1/2007

OTHER PUBLICATIONS

Office Action issued in corresponding Chinese Patent Application No. 200710126905.3; issued Sep. 12, 2008.

* cited by examiner

*Primary Examiner* — Charlie Peng
*Assistant Examiner* — Hung Lam
(74) *Attorney, Agent, or Firm* — Brinks Hofer Gilson & Lione

(57) ABSTRACT

A transflective liquid crystal display device includes a first substrate, a second substrate, a liquid crystal layer, and a pixel electrode. The first substrate has a thin film transistor and the second substrate has a color filter and faces the first substrate. The liquid crystal layer is disposed between the first and the second substrates. The pixel electrode is disposed above the first substrate and electrically connected to the thin film transistor. The transflective liquid crystal display device further includes a pixel region. The pixel region is divided into a transmit part and a reflective part, and the reflective part includes a first region and a second region. The pixel electrode extends to the transmit part and only the second region of the reflective part.

8 Claims, 8 Drawing Sheets

TRANSFLECTIVE TYPE LIQUID CRYSTAL DISPLAY DEVICE

PRIORITY CLAIM

This application claims the benefit of Korean Patent Application Nos. P2006-61537 filed on Jun. 30, 2006 and P2007-40231 filed on Apr. 25, 2007, which are hereby incorporated by reference by their entirety.

BACKGROUND

1. Technical Field

The present invention relates to a liquid crystal display (LCD) device, and more particularly, to an LCD device of a single cell gap transmitting-reflective type.

2. Description of the Related Art

LCD devices operate by using optical anisotropy and polarization properties of a liquid crystal material. Liquid crystal molecules have long and thin shapes and tend to align in the same direction according to an electric field. A suitable electric field controls the alignment direction of the liquid crystal molecules. The optical anisotropy of the liquid crystal material is changed and light propagating through the liquid crystal material is polarized. Accordingly, an image is displayed.

LCD devices include a thin film transistor array substrate with a thin film transistor and a pixel electrode; a color filter array substrate with a color filter layer; and a liquid crystal layer formed between the two substrates. Recently, an active matrix (AM) type LCD device has become popular due to high resolution and good picture quality. The AM type LCD device includes the thin film transistor and the pixel electrode arranged in a matrix configuration.

LCD devices do not emit the light. LCD devices use an additional light source, for example, a backlight unit. The amount of light viewed through LCD devices is about 7% of a total amount of light generated from the backlight unit. A high luminance LCD device may need a large amount of light, which may increase power consumption of the backlight unit. A heavy battery is required to power the backlight unit. The operating time of the backlight unit may be limited in a battery mode.

In bright surroundings, it may be difficult to recognize images displayed on LCD devices. Accordingly, a transmitting-reflective (referred to herein as "transflective") type LCD device is under development. The transflective type LCD device also may be referred to as a transreflective type LCD device. The transflective type LCD device may use both ambient light and the light generated from the backlight. The transflective type LCD device includes unit pixel regions, and each of the unit pixels has a transmitting part and a reflective part.

FIG. 1 illustrates a Vertical Assignment (VA) mode transflective type LCD device of the related art. FIG. 1 is a cross section view illustrating a related art VA mode transflective type LCD device 5. As shown in FIG. 1, the LCD device 5 includes a unit cell divided into a reflective part and a transmitting part. A cell gap of the reflective part is different from a cell gap of transmitting part, which is referred to as a dual cell gap structure. The dual cell gap structure is designed to provide a different birefringence to the reflective part and the transmitting part.

In FIG. 1, first and second substrates 10 and 30 are opposite to each other, and a liquid crystal layer 50 is formed between the first and second substrates 10 and 30. A backlight unit emits the light below the first substrate 10. In addition, alignment layers are formed on facing surfaces of the first and second substrates 10 and 30. Liquid crystal molecules of the liquid crystal layer 50 are aligned at a predetermined direction.

The first substrate 10 includes gate and data lines crossing each other to define a pixel region; a thin film transistor formed adjacent to the crossing of the gate and data lines; a passivation layer formed on the thin film transistor; a reflective sheet 11 formed on the passivation layer of reflective part so as to reflect the ambient light (natural or artificial light); an insulation layer 12 formed on an entire surface of the passivation layer including the reflective sheet 11; and a pixel electrode 13 of a transparent material formed on the insulation layer 12 and connected with a drain electrode of the thin film transistor. The pixel electrode 13 is provided with slit patterns 13a to divide the unit pixel region into multi-domains.

The second substrate 30 includes a black matrix layer to prevent light leakage on other portions except the pixel regions; an R/G/B color filter layer 32 to represent colors in the respective pixel regions; a common electrode 34 formed on the R/G/B color filter layer 32; and an overcoat layer 36 formed on the common electrode 34 of the reflective part.

In the reflective part, the ambient light passes through the liquid crystal layer 50 from the second substrate 30, and is then reflected on the reflective sheet 11, and again passes through the liquid crystal layer 50. Accordingly, the light passes through the liquid crystal layer 50 twice. For the transmitting part, the light passes through the liquid crystal layer once. In this case, the cell gap (g1) of the reflective part is different from the cell gap (g2) of transmitting part. The overcoat layer 36 creates two different cell gaps (g1) and (g2). The different cell gaps (g1) and (g2) also results in different phases of the light which passes the reflective part and the transmitting part.

Optical properties of the transmitting and the reflective parts may become consistent by controlling the thickness of the overcoat layer 36 formed on the common electrode 34 of the reflective part. However, additional processes of depositing and patterning the overcoat layer 36 to stay only on the reflective part may be performed. The gap difference is also generated between the transmitting part and the reflective part due to the overcoat layer 36. The gap difference affects an alignment layer deposited on the entire surface of the substrate including the overcoat layer 36 and a rubbing process. Rubbing defects may occur. Accordingly, there is a need for a transflective type LCD device that substantially obviates drawbacks of the related art.

SUMMARY

By way of introduction, in one embodiment, a transflective liquid crystal display device includes a first substrate, a second substrate, a liquid crystal layer, and a pixel electrode. The first substrate has a thin film transistor and the second substrate has a color filter and faces the first substrate. The liquid crystal layer is disposed between the first and the second substrates. The pixel electrode is disposed above the firs substrate and electrically connected to the thin film transistor. The transflective liquid crystal display device further includes a pixel region which has the thin film transistor, the liquid crystal layer and the pixel electrode, the pixel region. The pixel region is divided into a transmit part and a reflective part, and the reflective part includes a first region and a second region. The pixel electrode extends to the transmit part and only the second region of the reflective part.

In another embodiment, a transflective liquid crystal display device includes a pixel electrode and a pixel region having a single cell gap. The pixel region includes a transmit part and a reflective part. The transmit part delays a phase of a light by $\lambda/2$ and the reflective part delays the phase of the light by $\lambda/4$, where $\lambda$ is an optical phase retardation of liquid crystal.

In further another embodiment of a transflective display device, a pixel region includes a transmit part and a reflective part having a single cell gap. The reflective part includes a first region and a second region and delays a phase of a light by $\lambda/4$, where $\lambda$ is an optical phase retardation of liquid crystal. The transmit part delays the phase of the light by $\lambda/2$. The transflective display device further includes a pixel electrode which extends to the second region of the reflective part and the transmit part. The transflective display device further includes a common electrode facing the pixel electrode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS AND DRAWINGS

Reference will now be made in detail to the preferred embodiments of the present invention, examples of which are illustrated in the accompanying drawings. Wherever possible, the same reference numbers will be used throughout the drawings to refer to the same or like parts. Hereinafter, a transflective type LCD device is described with reference to the accompanying drawings.

A transflective LCD device of the following embodiments has a single cell gap. The dual cell gap structure is not used to provide a different birefringence to a reflective part and a transmit part. Instead, a pixel electrode is extended to a portion of the reflective part and the transmit part. The size of the portion of the reflective part where the pixel electrode is extended has optical properties different from those of the rest of the reflective part having no pixel electrode. The size of such portion may be selected such that overall optical properties of the reflective part is substantially identical to those of the transmit part and that the birefringence of liquid crystal of the reflective part is different from that of the transmit part. The transflective LCD device has a normally black mode and properly operates with the single cell gap structure.

First embodiment

Figure 1:
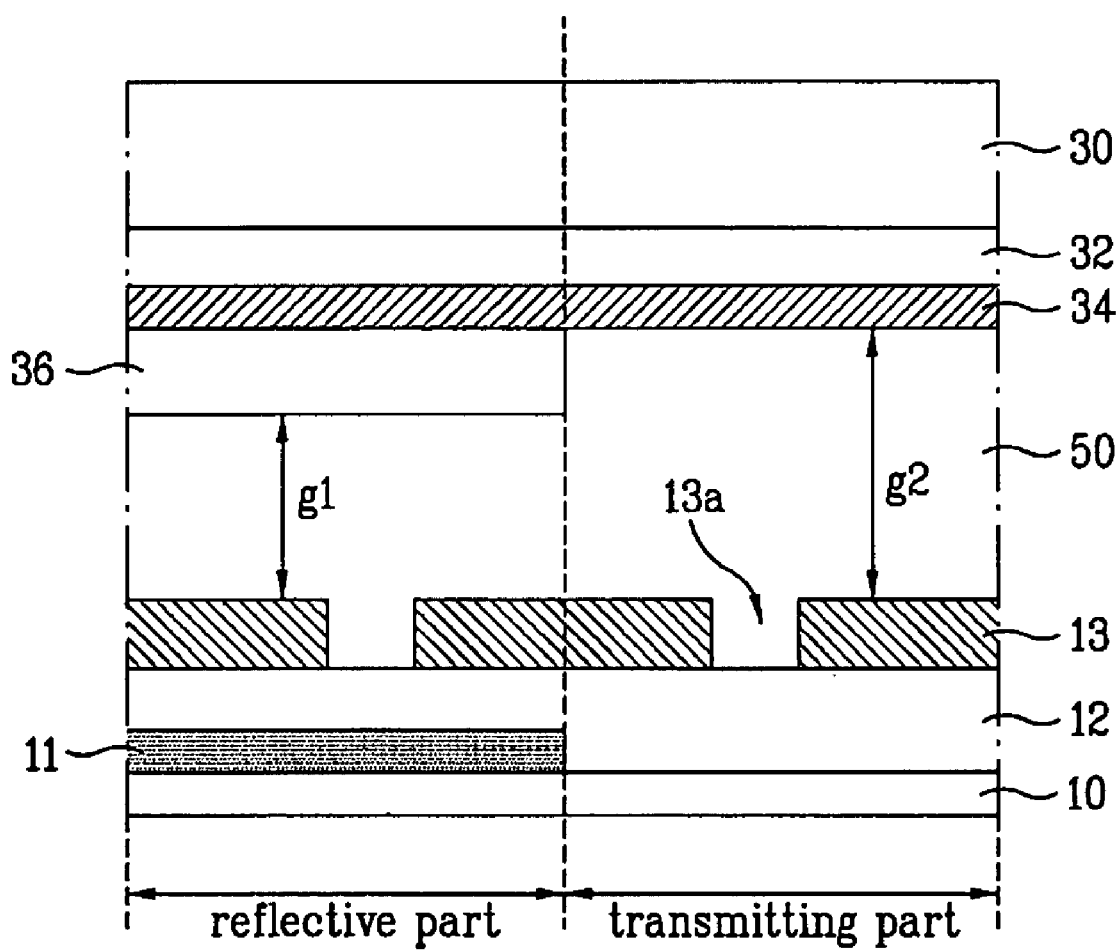
FIG. 1 is a cross section view illustrating a transflective type LCD device of the related art.
Figure 2:
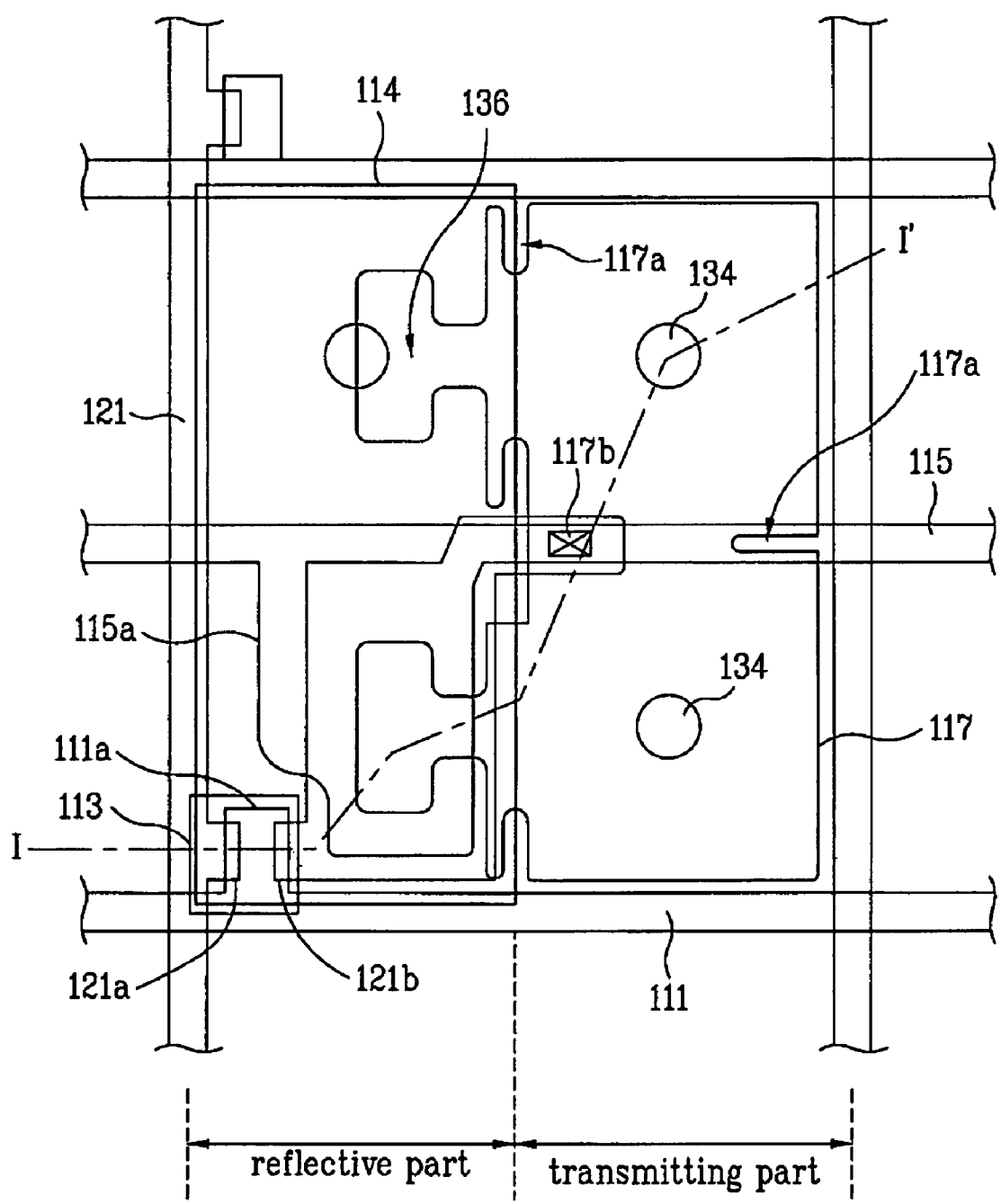
FIG. 2 is a plan view illustrating a transflective type LCD device according to a first embodiment.
Figure 3:
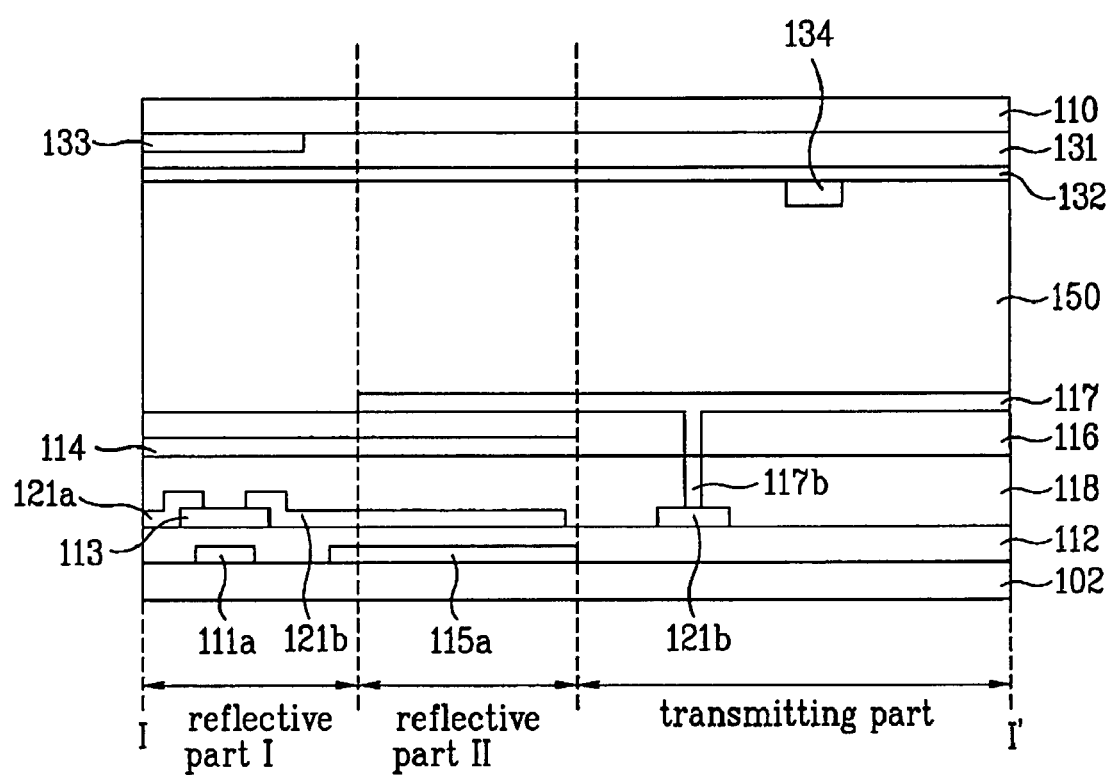
FIG. 3 is a cross section view along the line I-I' of FIG. 2.

FIG. 2 is a plan view illustrating a transflective type LCD device 100 according to a first embodiment. FIG. 3 is a cross section view along the line I-I' of FIG. 2. As shown in FIGS. 2 and 3, the transflective type LCD 100 includes first and second substrates 102 and 110 facing each other with a predetermined spacing; and a liquid crystal layer 150 formed between the first and second substrates 102 and 110. The first substrate 102 corresponds to a thin film transistor array substrate, and the second substrate 110 corresponds to a color filter array substrate. Each pixel region is divided into a reflective part and a transmitting part. Then, the reflective part is divided into a first region (reflective part I) where no pixel electrode is formed, and a second region (reflective part II) where the pixel electrode is formed. In FIG. 2, the second region 136 is located in the center of the left upper area of the pixel region. In other embodiments, the second region may be located at a different area of the pixel region. A backlight unit, although not shown, is positioned below the first substrate 102. In this embodiment, the LCD device 100 has a vertical alignment (VA) mode; however, it is not limited thereto. As long as the LCD device 100 has a normally black mode, various other modes such as a TN mode, an ECB mode, an OCB mode, etc. are possible.

As shown in FIG. 2, the first substrate 102 includes a plurality of gate lines 111 arranged at a first direction; a plurality of data lines 121 arranged at a second direction perpendicular to the first direction to define a plurality of pixel regions; and a plurality of common lines 115 arranged in parallel to the gate lines 111 in the respective pixel regions.

A plurality of thin film transistors are formed adjacent to the respective crossing portions of the gate and data lines 111 and 121. A reflective sheet 114 is formed in the reflective part of each pixel region, and a pixel electrode 117 is formed in the second region of the reflective part and the transmitting part of each pixel region.

At this time, each of the thin film transistors includes a gate electrode 111a protruding from the gate line 111; a gate insulation layer 112 covering the gate line 111 and the gate electrode 111a; a semiconductor layer 113 formed on the gate insulation layer 112 above the gate electrode 111a; and source and drain electrodes 121a and 121b formed at both sides of the semiconductor layer 113. The source electrode 121a is connected to the data line 121.

A passivation layer 118 is formed on an entire surface of the first substrate 102 including the thin film transistor. The reflective sheet 114 is also formed on the passivation layer of the reflective part. The reflective sheet 114 reflects the external light. Then, an insulation layer 116 is formed on the entire surface of first substrate including the reflective sheet 114.

A pixel electrode 117 is formed on the insulation layer 116 of the first substrate 102 in the pixel region. The pixel electrode 117 is electrically connected with the drain electrode of the thin film transistor. The pixel electrode 117 is not formed in the entireflective part of the pixel region. Instead, the pixel electrode 117 is formed in the transmitting part and the second region (the reflective part II). Although the pixel electrode is not formed in the first region (the reflective part I), the thickness of the pixel electrode is very small and may not affect the cell gap of the first region. By way of example only, the thickness of the pixel electrode is about 500 Å and the cell gap of the first region ranges between 3 μm and 4.5 μm. In other embodiment, various other dimensions are available for the cell gap and the pixel electrode.

In FIGS. 2 and 3, the drain electrode 121*b* of thin film transistor is extended to the upper side of common line 115, and the drain electrode 121*b* of the thin film transistor and the pixel electrode 117 contact each other on the common line 115 through a contact hole 117*b*. An extension 115*a* is extended from the common line 115 to the reflective part of the pixel region. Then, a storage capacitor (Cst) is formed between the extension 115*a* and the drain electrode 121*b* of the thin film transistor.

The second substrate 110 of the color filter array substrate includes a black matrix layer 133 formed other than on the pixel regions of the first substrate 102; an R/G/B color filter layer 131, which represents various colors corresponding to the pixel regions; and a common electrode 132 formed on the second substrate including the R/G/B color filter layer 131. At least one of open patterns 117*a* is formed in the pixel electrode 117 or the common electrode 132. The at least one of open patterns 117*a* includes, for example, a slit or a hole which divides the unit pixel into multi-domains. In FIG. 2, the at least one of open patterns 117*a* is formed in the pixel electrode 117 and divides the unit pixel into four domains. Ribs 134 may be additionally formed on the common electrode 132 or pixel electrode 117 in the center of each of multi-domains, as shown in FIGS. 2 and 3.

In FIG. 3, the pixel region has a single cell gap throughout the transmitting part and the reflective part. The pixel electrode formed in the reflective part II and the transmitting part may not affect the single cell gap structure, because the thickness of the pixel electrode may be negligible compared to the dimension of the cell gap. Light passes through the transmitting part once, whereas the light passes through the reflective part twice. The transmitting part and the reflective part, having the single cell gap, should have a different birefringence and an optical phase retardation λ of liquid crystal. For instance, the transmitting part has λ/2, and the reflective part has λ/4.

The size of the first region (reflective part I) and the size of the second region (reflective part II) may be selected such that the transflective LCD device 100 may properly operate with the single cell gap. By controlling the size, upon application of the same voltage to the reflective and transmitting parts, the transmitting part and the reflective part have the different birefringence. Specifically, the reflective part has a birefringence (Δ neff: Effective birefringence) and a phase difference which are different from those of the transmitting part. After dividing the unit pixel region into the reflective and transmitting parts, the size of the second region having the pixel electrode 117 and the first region having no pixel electrode 117 may be selected.

Upon application of the same voltage to the pixel region, the first region (reflective part I) of the reflective part has the low optical properties because no pixel electrode is formed. On the other hand, the second region (reflective part II) of the reflective part has the high optical properties because the pixel electrode is formed. The average optical properties of the first and second regions (reflective part I, reflective part II) of the reflective part may be designed to be identical to those of the transmitting part. This may result in overall uniform optical properties of the LCD device 100. The gamma properties of the reflective part also may be substantially the same as the gamma properties of the transmitting part.

The size of the reflective and transmitting parts may correspond to capacitance values of each part. As the size becomes larger, the capacitance values may tend to increase. The capacitance values also may be affected by the structure of the reflective part. In particular, the absence of the pixel electrode in the first region (reflective part I) may create a different capacitance value, as will be described in detail below.

Figure 4:
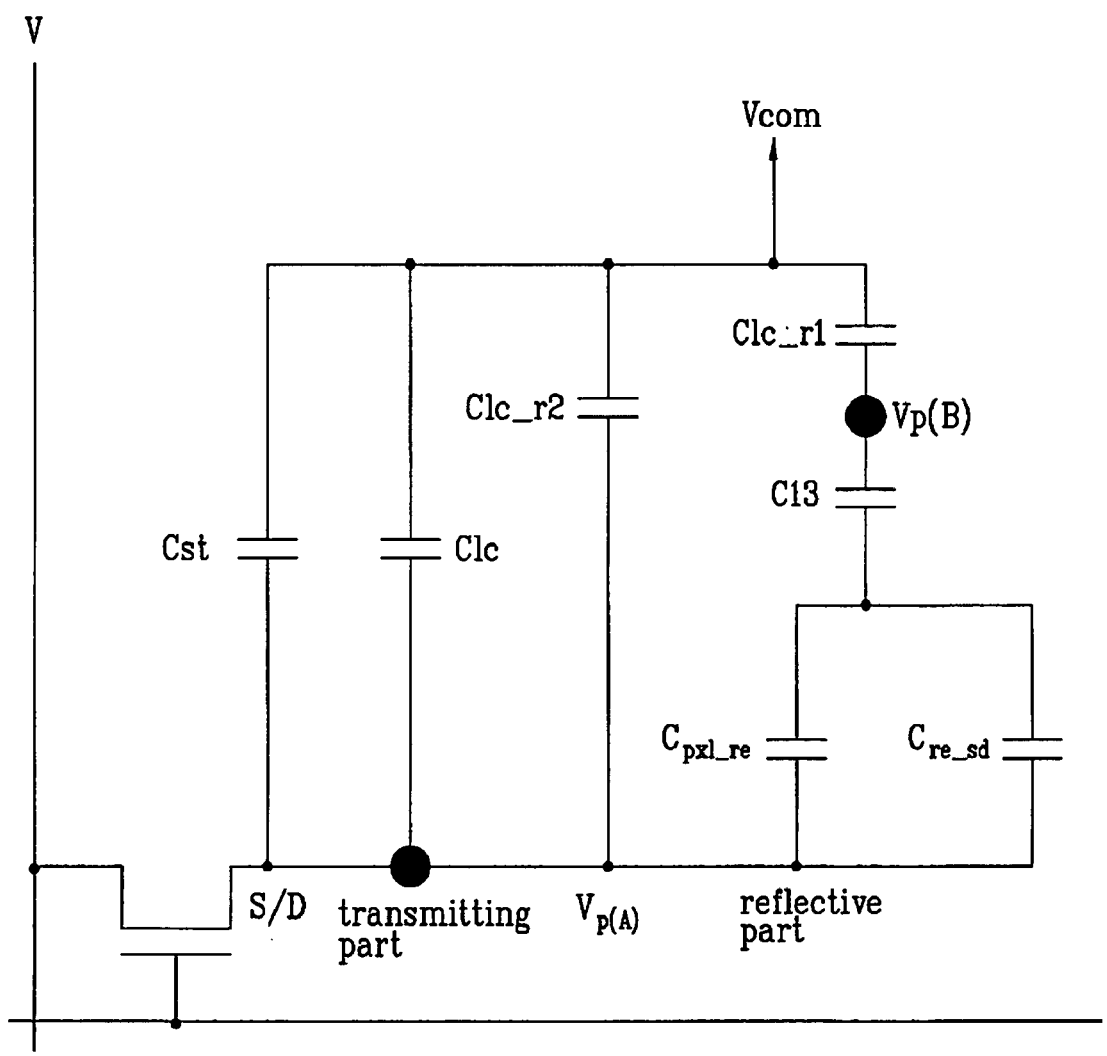
FIG. 4 is a schematic view illustrating capacitance values for a unit pixel according to the first embodiment.

The changed optical properties of the reflective part relates to the location of the pixel electrode. The changed optical properties are explained with capacitors formed in the transmitting part and the reflective part as shown in FIG. 4. FIG. 4 is a schematic view illustrating capacitance values for a unit pixel according to the first embodiment. The transmitting part is provided with a storage capacitor (Cst) formed between the drain electrode 121*b* and the common line 115; and a liquid crystal capacitor (Clc) formed between the pixel electrode 117 and the common electrode 132.

The second region (reflective part II) is provided with a liquid crystal capacitor (Clc_r2) formed between the pixel electrode 117 and the common electrode 132 and a first capacitor (Cpxl_re) is formed between the pixel electrode 117 and the reflective sheet 114. The first capacitor (Cpxl_re) is a parasite capacitor and may have very small capacitance. The first capacitor (Cpxl_re) does not affect the driving of the liquid crystal. The first region (reflective part I) is provided with a second capacitor (Clc_r1), a third capacitor (C13) and a fourth capacitor (Cre-sd). The second capacitor (Clc_r1) is formed between the reflective sheet 114 and the common electrode 132, and the liquid crystal layer 150 is used as a dielectric layer. The third capacitor (C13) is formed between the reflective sheet 114 and the common electrode 132, and the insulation layer 116 is used as a dielectric layer. The fourth capacitor (Cre-sd) is formed between the reflective sheet 114 and the drain electrode 121*b*.

The third capacitor (C13) may affect the driving of the liquid crystal layer because no pixel electrode is extended to the first region (reflective part I). If the pixel electrode may be extended to the first region (reflective part I), a capacitor would have been formed between the pixel electrode and the reflective sheet 114. Such capacitor would have been formed and operated in the same manner as the first capacitor (Cpxl_re) as shown in FIG. 4. Unlike the third capacitor (C13), such capacitor does not affect the driving of the liquid crystal. The third capacitor operates based on an induced voltage applied to the reflective sheet 114 and the common voltage Vcom. The third capacitor (C13) may affect the voltage applied to the first region (reflective part I). In particular, the third capacitor (C13) may reduce the voltage applied to the first region, which results in reducing the optical properties of the first region. The first capacitor (Cpxl_re) may be added to the third capacitor (C13) to affect the voltage applied to the first region. Alternatively, the first capacitor (Cpxl_re) may be ignored due to a small capacitance. The reduced optical properties of the first region (reflective part I) may compensate the high optical properties of the second region (reflective part II). Accordingly, the optical properties of the first region and the second region may even out and the reflective part may present the average optical properties, which may be substantially the same as those of the transmitting part.

Voltage Vp(B) applied to the first region (reflective part I) and the voltage Vp(A) applied to the transmitting part and the second region (reflective part II) are expressed as follows:

$$Vp(A) = V \frac{1}{Cst + Clc} \qquad \text{(Equation 1)}$$

$$Vp(B) = Vp(A) \frac{Ccc}{Clc\_r1 + Ccc}, \text{ where}$$

$$Ccc = \frac{1}{\frac{1}{C13} + \frac{1}{Cpx1\_re + Cre\_sd}} \qquad \text{(Equation 2)}$$

Accordingly, the voltage Vp(B) applied to the first region of the reflective part may be measured based on the capacitor values.

The occupied space for the second region and the occupied space for the first region are controlled such that the transmitting part has the operation properties of $\Delta nd(eff)=\lambda/2$ (where $\Delta nd(eff)$ is an effective phase difference, and $\lambda$ is the optical phase retardation of liquid crystal) and the reflective part has the operation properties of $\Delta nd=\lambda/4$ as follows:

Rtotal={Rp(A)×the size of the second region+Rp(B)× the size of the first region of the reflective part}/2  (Equation 3)

Rtotal is the effective reflectance of the reflective part, Rp(A) is the reflectance of the second region, and Rp(B) is the reflectance of the first region. As noted above, the reflectance of the reflective part may be represented by $\Delta nd(eff)=\lambda/4$ and the transmittance of the transmitting part may be represented by $\Delta nd(eff)=\lambda/2$.

As noted above, the size of the first and the second regions may be related to the capacitors as shown in FIG. 4. For instance, as the size of the first region increases, the capacitance of the third capacitor (C13) may also increase, which may further reduce the optical properties of the first region. As the pixel electrode 117 is formed in the predetermined portion of the reflective part instead of the entire reflective part, the occupied space of the pixel electrode 117 decreases in the reflective part. The single cell gap of the LCD device 100 may be designed by controlling the size of the reflective part.

Figure 5:
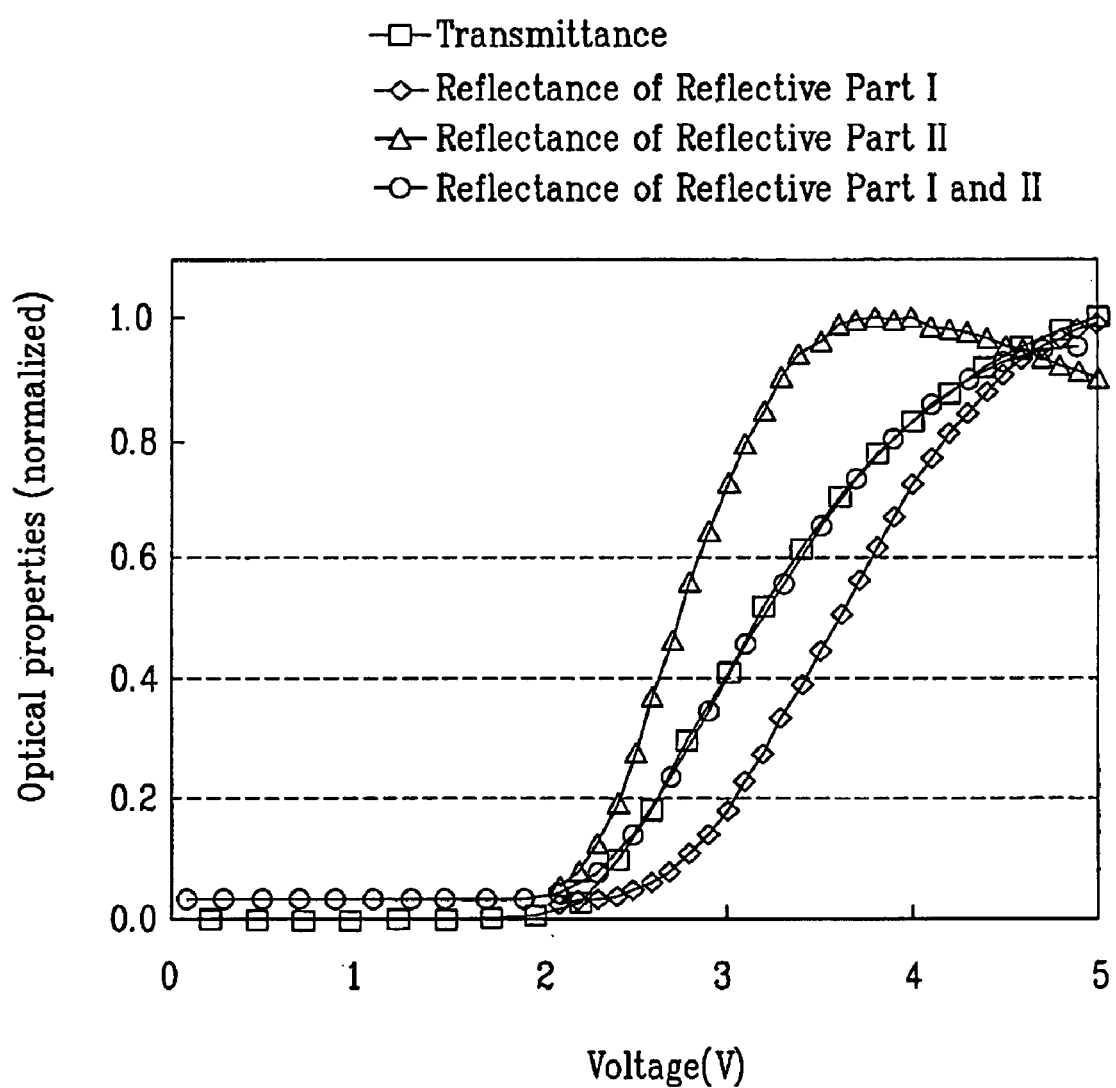
FIG. 5 is a graph illustrating optical properties of transmitting and reflective parts according to the first embodiment.

FIG. 5 is a graph illustrating the optical properties of the transflective LCD device 100. When the same voltage (e.g. 3V) is applied to the pixel electrode 117, the reflectance the first region (reflective part I) is lower than that of the transmitting part. The reflectance of the second region (reflective part II) having the pixel electrode is higher than transmittance of the transmitting part. Accordingly, the average optical properties of the first and second regions of the reflective part may become identical to the optical properties of the transmitting part. The transflective LCD device 100 may have the single cell gap and properly operate.

Figure 6:
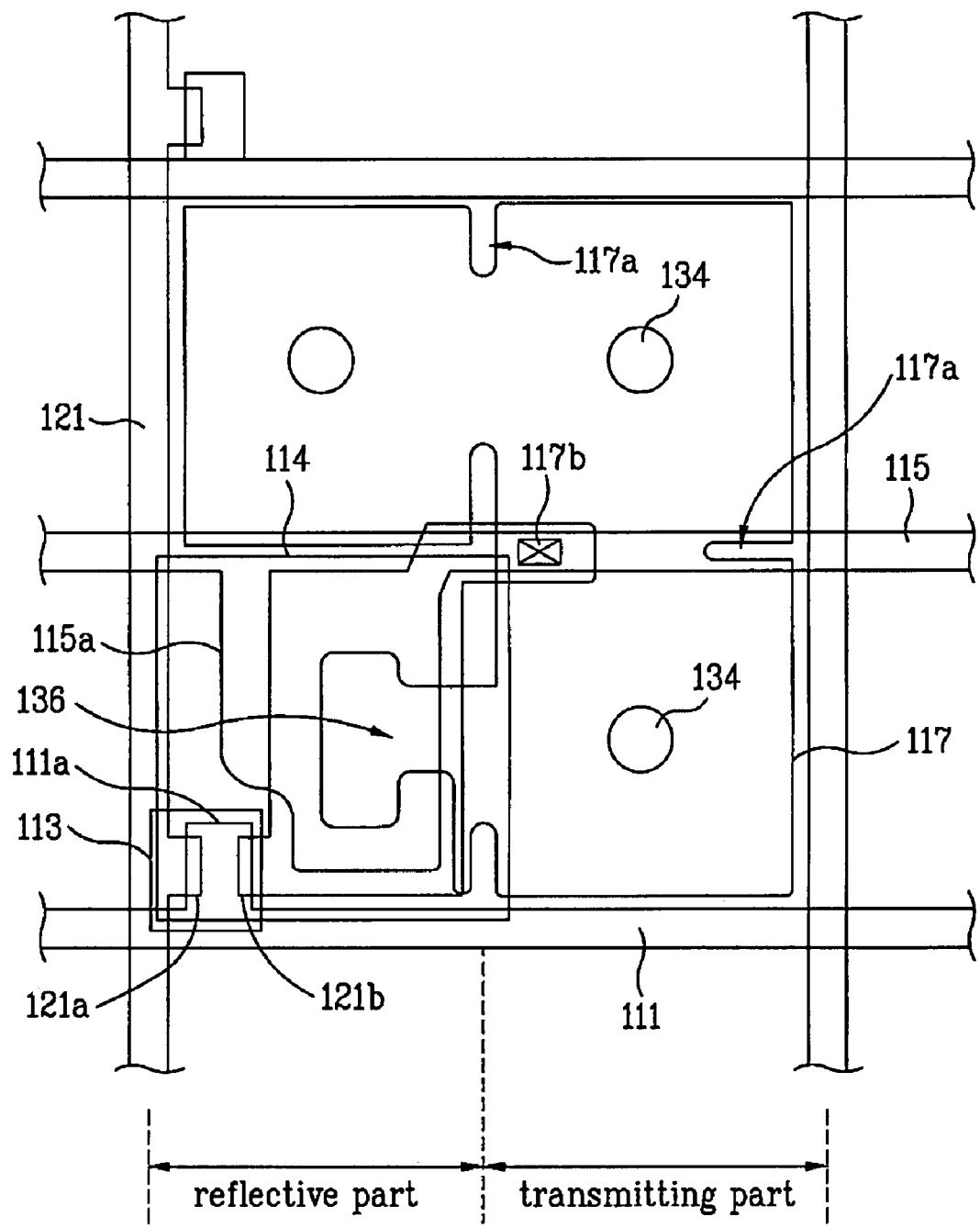
FIG. 6 is a plan view illustrating a transflective type LCD device according to a second embodiment.

FIG. 6 is a plan view illustrating a VA mode transflective type LCD device 200 according to a second embodiment. The LCD device 200 has the different sizes of the reflective and transmitting parts in the unit pixel region, compared to the first embodiment described in conjunction with FIGS. 2-5. In FIG. 2, the pixel electrode 117 is extended to about half of the pixel region. In FIG. 6, the pixel electrode 117 is extended to more than half of the pixel region.

The unit pixel region is divided into the reflective and transmitting parts. As shown in FIG. 6, the reflective part occupies about a quarter of the unit pixel region, and the transmitting part occupies three quarters of the unit pixel region. The pixel electrode 117 is formed in the predetermined portion of the reflective part. The reflective part is divided into the first and second regions, and the pixel electrode 117 is formed in the transmitting part and the second region of the reflective part. The second region 136 of the reflective part may be positioned in the center of a sub-pixel of the pixel region.

The pixel region may include four sub-pixels which represent red (R), green (G), blue (B) and white (W) colors. When the reflective part occupies a quarter of the pixel region, it may represent white color. Three quarters of the transmitting part represent red, green and blue colors. The pixel region shown in FIG. 6 is suitable for displaying R-G-B-W colors in its sub-pixels.

The pixel electrode 117, common electrode 132, or both includes the open pattern 117a, for example, the slit or the hole to divide the unit pixel into multi-domains.

Third Embodiment

Figure 7:
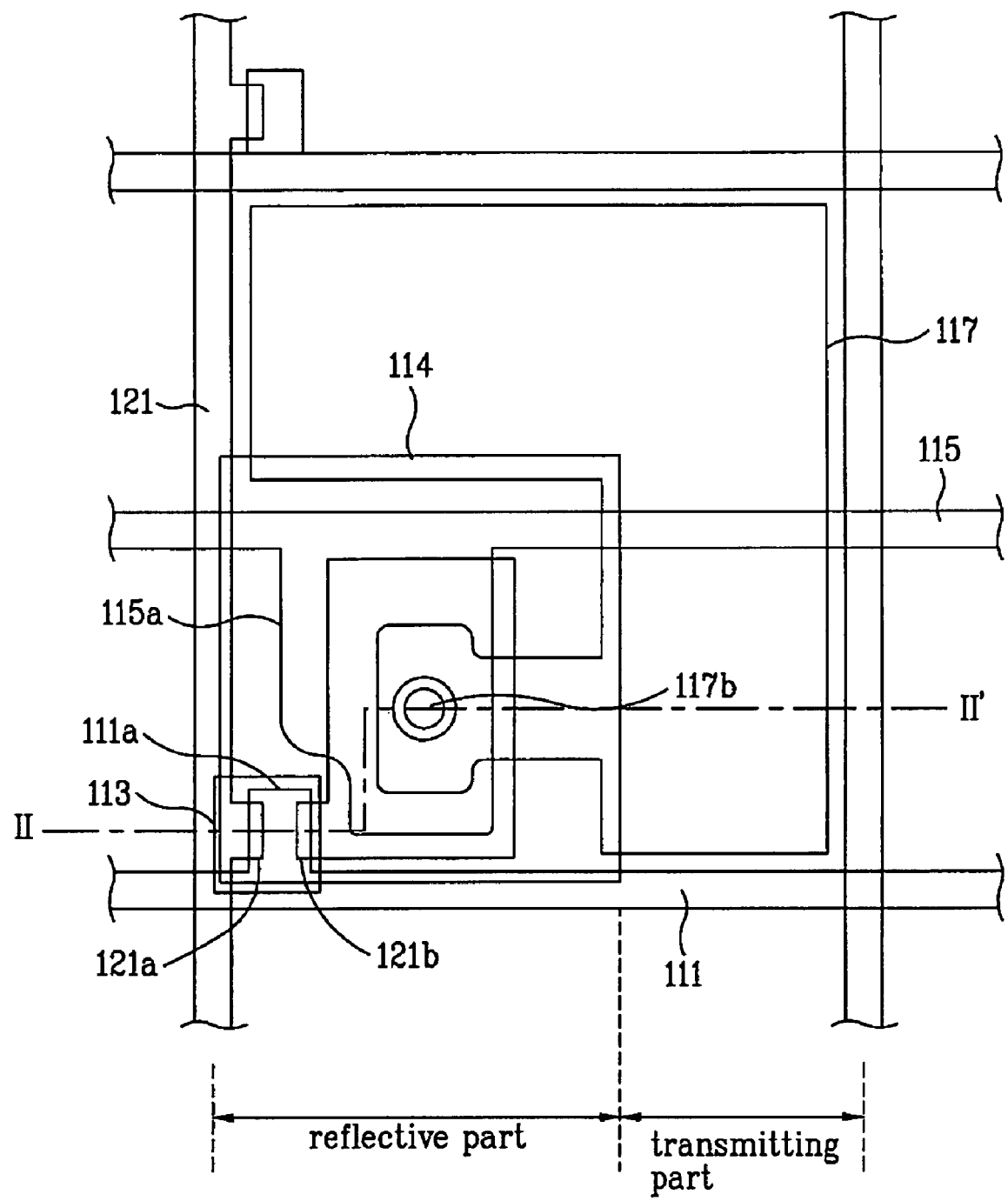
FIG. 7 is a plan view illustrating a transflective type LCD device according to a third embodiment.
Figure 8:
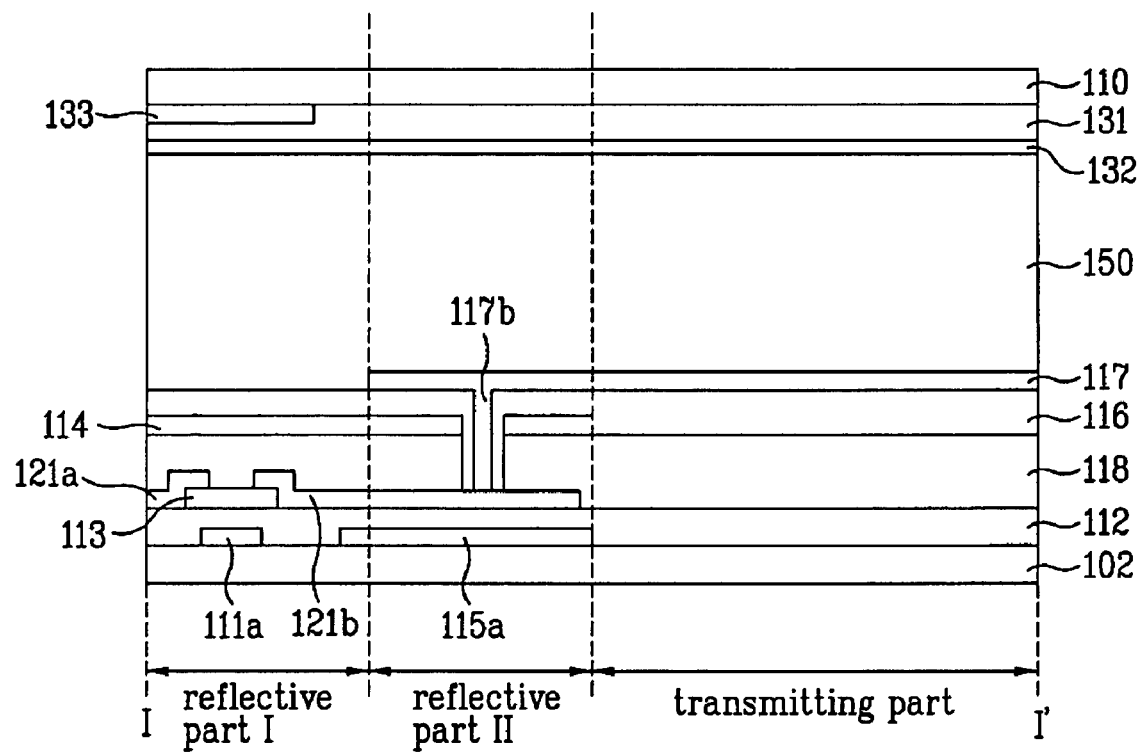
FIG. 8 is a cross section view along the line II-II' of FIG. 7.

FIG. 7 is a plan view illustrating a transflective type LCD 300 device according to a third embodiment. FIG. 8 is a cross section view along the line II-II' of FIG. 7. The transflective type LCD 300 has the VA mode, but it is not limited thereto and a normally black mode is available. In the third embodiment, a unit pixel region is divided into at least two regions, and the divided regions are rubbed in different directions, to thereby form multi-domains. In this embodiment, the open patterns 117a may not be formed in the pixel electrode 117 or the common electrode 115. Alternatively, or additionally, the rib 134 may not be formed on the pixel electrode 117 or the common electrode 115.

As shown in FIGS. 7 and 8, the VA mode transflective type LCD device 300 includes the first substrate 102 of the thin film transistor array substrate, the second substrate of a color filter array substrate, and the liquid crystal layer 150 interposed between the first and second substrates 102 and 110 facing each other. Each pixel region is divided into the transmitting part and the reflective part, and the reflective part is divided into the first region (reflective part I) where no pixel electrode is formed, and the second region (reflective part II) where the pixel electrode is formed. The reflective part is formed in the portion including the thin film transistor, and the transmitting part is formed in the other portions. In addition, a backlight unit may be provided below the first substrate 102.

In the third embodiment, the pixel electrode 117 is formed not in the entire reflective part of pixel region but in the transmitting part and the second region of the reflective part which is adjacent to the transmitting part. The size of the pixel electrode formed in the transmitting part of the pixel region is larger than the size of the pixel electrode formed in the reflective part of the pixel region.

Although not shown, an alignment layer is formed on the first substrate 102, the second substrate 110, or both. Each pixel region is divided into at least two regions, and the alignment layer for the respective regions of each pixel is rubbed at different directions, thereby forming the multi-domains.

The size of the first region (reflective part I) having no pixel electrode and the second region (reflective part II) having the pixel electrode may be controlled based on the voltage (Vp (B)) of reflective part. When the same voltage is applied to the reflective and transmitting parts, it is possible to realize the single cell gap transflective type LCD device 300 having the different birefringence ratios ($\Delta$ neff) in the reflective and transmitting parts. The single cell gap based on the location of the pixel electrode has the capacitor structures described in conjunction with FIG. 4 above.

As previously described in connection with the embodiments, the transflective type LCD device has the single cell gap structure. The transmitting and the reflective parts have the same cell gap by controlling the birefringence (Δ neff) of liquid crystal. The birefringence (Δ neff) of liquid crystal may be controlled by changing the size of the first region and the second region of the reflective part and by extending the pixel electrode only to the second region. The transflective type LCD device does not include the overcoat layer for creating the dual cell gap. Additional manufacturing process relating to the overcoat layer may not be needed and the manufacturing process may be simplified. Thus, the optical properties of the transmitting and reflective parts become consistent with each other through the simplified process. Furthermore, without the overcoat layer, the reflective part may obtain the operation properties of the phase difference of $\Delta nd=\lambda/4$. The defective alignment may be minimized because the overcoat layer is not formed, and the single cell gap is realized without step differences. Accordingly, a yield may improve and the unit cost for the device may decrease.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

We claim:

1. A transflective liquid crystal display device, comprising:
   a first substrate having a thin film transistor;
   a second substrate having a color filter and facing the first substrate;
   a liquid crystal layer disposed between the first and the second substrates;
   a pixel electrode disposed above the first substrate and electrically connected to the thin film transistor;
   a pixel region configured to be divided into a transmit part and a reflective part wherein the reflective part includes a first region and a second region,
   wherein the pixel electrode extends to the transmit part and only the second region of the reflective part except the first region of the reflective part,
   wherein the first region and the second region comprise a first set of capacitors and the transmit part comprises a second set of capacitors, the capacitors configured such that a cell gap in the transmit part is the same as the cell gap in the reflective part,
   wherein the first set of capacitors includes a liquid crystal capacitor formed between the pixel electrode and a common electrode; and a first capacitor formed between the pixel electrode and a reflective sheet, and
   wherein the common electrode is disposed on the second substrate and the reflective sheet is disposed between the pixel electrode and the first substrate and reflects light passed through the liquid crystal layer.

2. The device of claim 1, wherein the second region of the reflective part is disposed in the center of the reflective part.

3. The device of claim 1, wherein the first region has low optical properties and the second region has high optical properties upon application of the same voltage.

4. The device of claim 1, wherein the first set of capacitors further comprises:
   a second capacitor formed between the reflective sheet and the common electrode and using the liquid crystal layer as a dielectric layer;
   a third capacitor coupled in series to the second capacitor and formed between the reflective sheet and the common electrode, the third capacitor using an insulating layer as the dielectric layer; and
   a fourth capacitor coupled in series to the third capacitor and formed between the reflective sheet and a drain electrode of the thin film transistor.

5. The device of claim 1, wherein the second region comprises the liquid crystal capacitor and the first capacitor.

6. The device of claim 1, wherein the first region comprises the second, the third and the fourth capacitors.

7. The device of claim 1, wherein the second set of capacitors comprises:
   a storage capacitor formed between a drain electrode of the thin film transistor and a common line; and
   a liquid crystal capacitor formed between the pixel electrode and a common electrode.

8. The device of claim 3, wherein the average optical properties of the first region and the second region is the same as the optical properties of the transmit part.

* * * * *